United States Patent [19]

Sawada et al.

[11] Patent Number: 5,434,721
[45] Date of Patent: Jul. 18, 1995

[54] RECORDING/REPRODUCING APPARATUS FOR RECORDING/REPRODUCING INFORMATION TO AND/OR FROM A PLURALITY OF TYPES OF RECORDING MEDIUM CASSETTES

[75] Inventors: Takashi Sawada; Hiroshi Okada, both of Kanagawa, Japan

[73] Assignee: Sony Corporation, Tokyo, Japan

[21] Appl. No.: 67,285

[22] Filed: May 26, 1993

[30] Foreign Application Priority Data

Jun. 2, 1992 [JP] Japan .................. 4-165444
Jun. 9, 1992 [JP] Japan .................. 4-173689

[51] Int. Cl.$^6$ .............................. G11B 23/34
[52] U.S. Cl. ............................. 360/69; 360/132
[58] Field of Search ........... 360/69, 137, 27, 132, 360/71

[56] References Cited

U.S. PATENT DOCUMENTS 4,338,644 7/1982 Staar .................. 360/69 X
4,593,337 6/1986 Leone et al. ............. 360/137

FOREIGN PATENT DOCUMENTS 0373718 6/1990 European Pat. Off. .
0533002 3/1993 European Pat. Off. .
WO84/03791 9/1984 WIPO .
WO91/02355 2/1991 WIPO .

Primary Examiner—Aristotelis Psitos
Assistant Examiner—James L. Habermehl
Attorney, Agent, or Firm—William S. Frommer; Alvin Sinderbrand

[57] ABSTRACT

A recording/reproducing apparatus for recording information on and reproducing recorded information from the recording medium of a recording medium cassette comprises a cassette identifying circuit capable of identifying a first recording medium cassette provided with an IC plate provided with an IC chip and a plurality of terminals connected to the IC chip in a specified circuit pattern representing information about the first recording medium cassette and a second recording medium cassette provided with a terminal plate provided with a plurality of terminals connected in a specified circuit pattern representing information about the second recording medium cassette. The cassette identifying circuit identifies the first (second) recording medium cassette automatically on the basis of voltage signals that appear at the plurality of terminals of the first (second) recording medium cassette when the first (second) recording medium cassette is inserted in the recording/reproducing apparatus to enable the user to use the first and second recording medium cassettes indiscriminately.

6 Claims, 9 Drawing Sheets

FIG.II
PRIOR ART
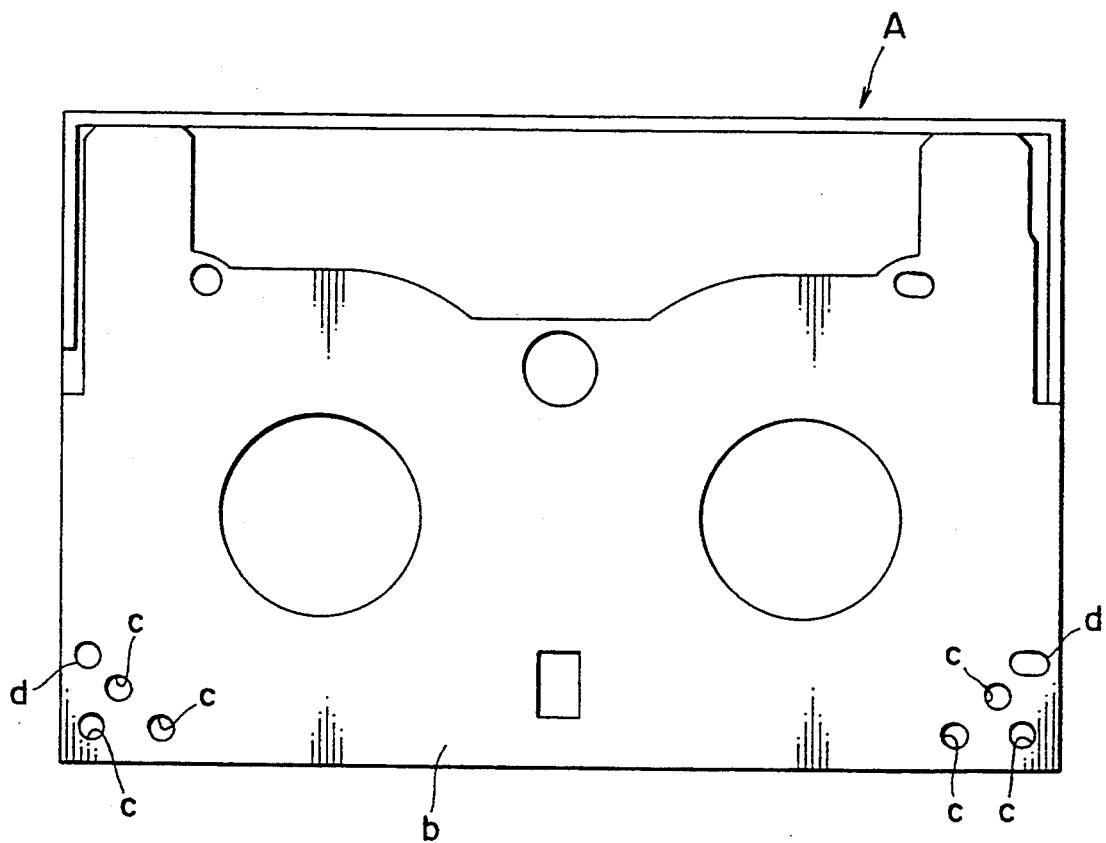

RECORDING/REPRODUCING APPARATUS FOR RECORDING/REPRODUCING INFORMATION TO AND/OR FROM A PLURALITY OF TYPES OF RECORDING MEDIUM CASSETTES

BACKGROUND OF THE INVENTION

1. Field of the Invention

The present invention relates to a recording/reproducing apparatus or a reproducing apparatus such as a video tape recorder (hereinafter abbreviated to "VTR") or a video cassette recorder (hereinafter abbreviated to "VCR"). More specifically, the present invention relates to a recording medium cassette capable of giving pieces of information about the recording medium cassette to a recording/reproducing apparatus and of recording pieces of information, or a recording/reproducing apparatus or a reproducing apparatus capable of identifying recording medium cassettes which provides pieces of information.

2. Description of the Related Art

Specific pieces of information about the recording medium cassette for use on a VTR or a VCR, including the length of the tape, the available capacity of the tape, the condition of the tape, namely, whether or not information is recorded on the tape, and the category of the tape, namely, whether or not the tape is a rental video tape, are necessary to prevent damaging important data recorded on the tape, to achieve correct recording, and to prevent illegal use of the tape by recording the number of times of dubbing.

Accordingly, these specific pieces of information are written in a specified area in the tape, such as a subcode area, and the pieces of information are changed or additional pieces of information are added to the previously recorded pieces of information when picture recording or picture reproducing has been completed on a recording/reproducing apparatus or when removing the recording medium cassette from a VTR or a VCR. Some recording medium cassettes are provided with recognition holes representing pieces of information in the opposite ends of the bottom wall thereof.

As shown in FIG. 11, a recording medium cassette A is provided with a plurality of recognition holes c representing the type and qualities thereof in the opposite corners of the bottom wall thereof. Matters to be displayed including the type of the magnetic tape and the thickness of the magnetic tape are assigned to the plurality of recognition holes c, respectively. When the recording medium cassette A is inserted in a recording/reproducing apparatus having switches provided with detecting pins, the detecting pins are inserted in the recognition holes c, and the recording/reproducing apparatus recognizes pieces of information represented by the recognition holes c from the depths of the recognition holes c detected by the detecting pins. In FIG. 11, indicated at d are positioning holes.

When it is desired that pieces of information about the recording medium cassette A are written in a specified area of the tape contained in the recording medium cassette A, it takes time to write the pieces of information in the specified area or to read the pieces of information from the specified area. When writing the pieces of information in the specified area, in particular, the tape needs to be rewound after completing picture recording or picture reproducing to set the specified area at a writing position, which is not an efficient method of writing the pieces of information in the specified area of the tape.

Tape cassettes provided with an IC chip for storing information about the recording medium cassettes have been proposed in:

U.S. Pat. No. 4,338,644 Jul. 6, 1982 (Theophiel C. J. L. Starr),
U.S. Pat. No. 4,383,285 May 10, 1983 (Theophiel C. J. L. Starr),
U.S. Pat. No. 4,426,684 Jan. 17, 1984 (Claude Sechet et al.) and U.S. Pat. No. 4,839,875 Jun. 13, 1989 (Zenkichi Kuriyama et al.).

Although these previously proposed recording medium cassettes facilitate storing information about the recording medium cassettes, the IC chip increases the cost of the recording medium cassettes. It may be economical to use both relatively expensive recording medium cassettes provided with an IC chip, which will be called an IC type recording medium cassette, and a relatively inexpensive recording medium cassettes provided with only a terminal plate having a plurality of terminals, which will be called terminal type recording medium cassettes. The plurality of terminals are connected by conductors to the plate in a circuit pattern representing pieces of specific information about the recording medium cassette. These two kinds of recording medium cassettes must enable the user to use these two kinds of recording medium cassettes without discrimination. Therefore, the IC type recording medium cassette provided with an IC and the terminal type recording medium cassette provided with a terminal plate must be able to be identified automatically, or these recording medium cassettes will not be prevalently used.

Accordingly, the information about the recording medium cassette must be automatically converted into corresponding data when the recording medium cassette is inserted in a recording/reproducing apparatus whether or not the recording medium cassette is provided with an IC chip.

SUMMARY OF THE INVENTION

Accordingly, it is an object of the present invention to provide a recording/reproducing apparatus for recording information on and reproducing recorded information from a recording medium cassette, provided with an identifying means capable of discriminating between a first recording medium cassette provided with an IC chip and a plurality of terminals formed on the surface thereof and connected to the IC chip, and a second recording medium cassette not provided with any IC chip and provided with a plurality of terminals on the surface thereof at positions corresponding to those of the terminals of the first recording medium cassette.

Since the recording/reproducing apparatus is capable of automatically discriminating between the recording medium cassette with IC and the recording medium cassette with terminals, the IC type recording medium cassette with IC and the terminal type recording medium cassette with terminals are compatible with each other. The identifying means identifies the recording medium cassette by an electric value specific to the recording medium cassette. The identifying means can be formed in a simple circuit configuration when the electric value is a voltage.

The voltage signals that appear at the plurality of terminals of the recording medium cassette, connected in a circuit pattern by conductors can be used for recognition.

The unnecessary actions of the microcomputer can be omitted by identifying the recording medium cassette substantially simultaneously with the insertion of the recording medium cassette in the recording/reproducing apparatus.

Thus, the recording/reproducing apparatus is able to discriminate between the IC type recording medium cassette and the terminal type recording medium cassette without using any special means, such as a switch or the like, enables the user to use these recording medium cassettes of different types indiscriminately, and has a simple construction.

The cassette identifying circuit that uses voltage signals for identifying the recording medium cassette has a simple circuit configuration.

Pieces of specific information about the terminal type recording medium cassette can be represented by connecting the terminals in an appropriate circuit pattern and hence the recording medium cassette need not be provided with any recognition holes in its bottom wall, which enables the cost and size of the recording medium cassette to be reduced.

BRIEF DESCRIPTION OF THE DRAWINGS

The above and other objects, features and advantages of the present invention will become more apparent from the following description taken in connection with the accompanying drawings, in which:

FIG. 11 is a recording medium cassette provided with recognition holes.

DETAILED DESCRIPTION OF THE PREFERRED EMBODIMENTS

Figure 1:
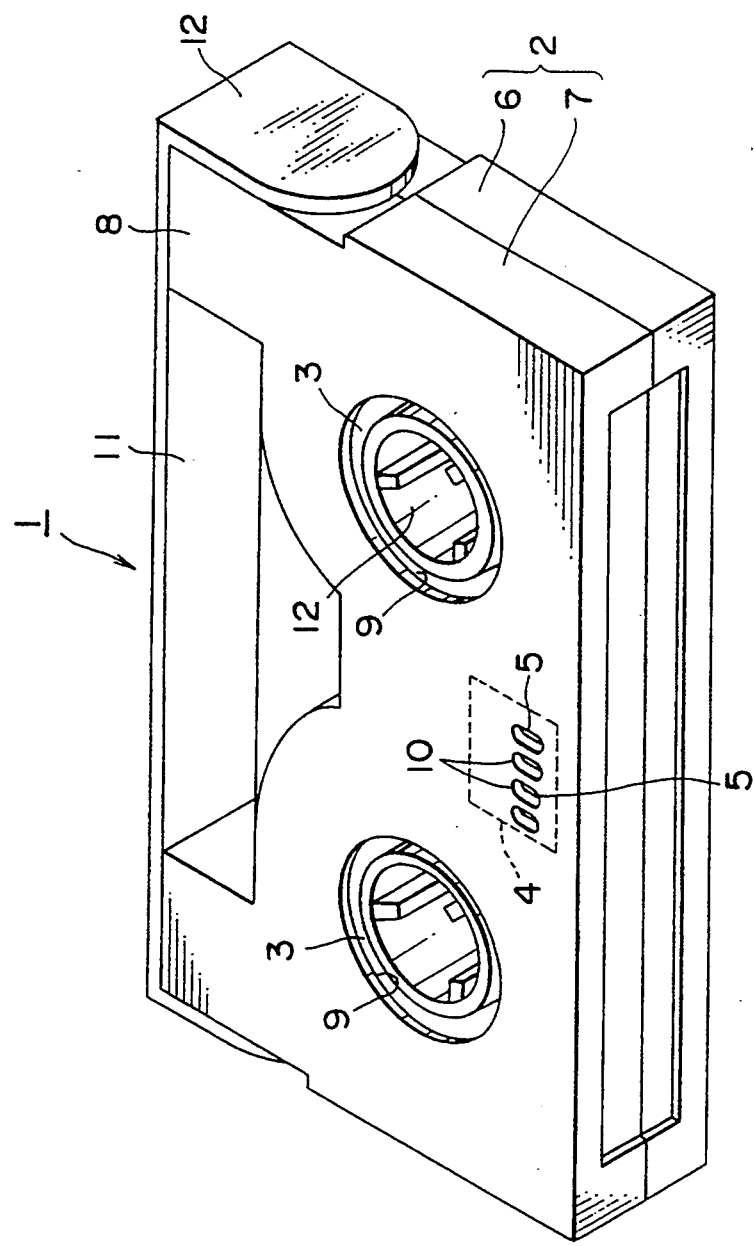
FIG. 1 is a perspective view of a recording medium cassette suitable for use on a recording/reproducing apparatus in a accordance with the present invention.

Referring to FIG. 1, a recording medium cassette 1 has a case 2, a pair of tape reels 3 disposed within the case 2, and an IC plate 4 placed within the case 2 and provided with terminals 5 accessible from outside. The case 2 is formed in the shape of a flat, rectangular box by joining together a top half case 6 and a bottom half case 7. Formed in the bottom wall 8 of the bottom half case 7 are holes 9 for receiving the bosses of the pair of tape reels 3, terminal slots 10 through which the terminals 5 of the IC plate 4 are accessible and a mouth 11 across which a magnetic tape, not shown, held in the case 2 is extended. The front opening of the case 2 is covered with a turning lid 12. The magnetic tape is wound on the tape reels 3.

Figure 2:
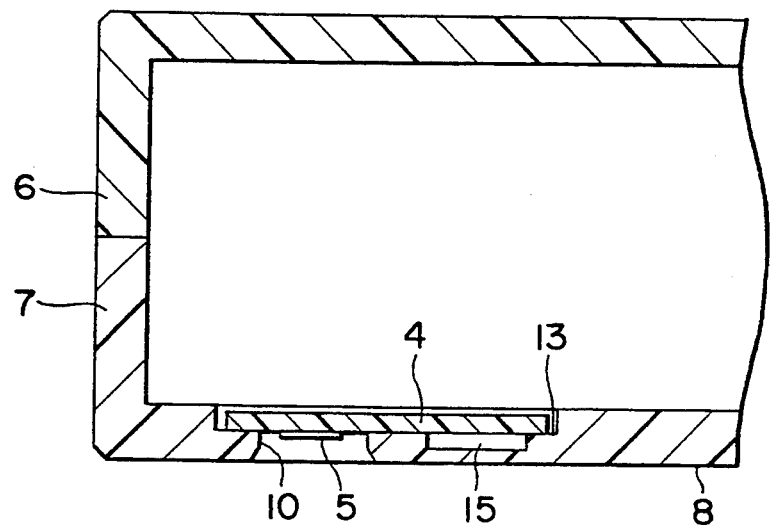
FIG. 2 is an enlarged, fragmentary sectional view of an essential portion of the recording medium cassette of FIG. 1.
Figure 3:
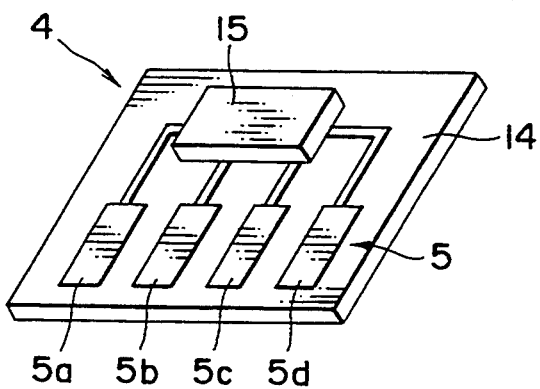
FIG. 3 is a perspective view of an IC plate suitable :for use in combination with the recording medium cassette of FIG. 1.

Referring to FIGS. 2 and 3, the IC plate 4 comprises a printed wiring board 14, terminals 5 formed on the printed wiring board 14, and an IC chip 15 mounted on the printed wiring board 14. The IC plate 4 is placed in a shallow, substantially rectangular recess 13 formed in the inner surface of the bottom wall 8 of the case 2 at the middle of the rear portion of the bottom wall 8. The four terminal slots 10 are arranged laterally in the recess 13. The IC plate 4 fits the recess 13 exactly. The plurality of rectangular terminals 5 elongate in the direction of width of the case 2 are arranged on the printed wiring board 14 of the IC plate 4 in the direction of length of the case 2 so as to coincide with the terminal slots 10, respectively. These terminals 5 are gold-plated to secure durability and reliability. The IC chip 15 is mounted on the printed wiring board 14 of the IC plate 4 and connected to the terminals 5 in a circuit pattern by conductors. For example, the terminal 5a is a power supply terminal, the terminal 5b is a data I/O terminal, the terminal 5c is a clock terminal and the terminal 5d is a grounding terminal. The IC plate 4 is fixedly fitted in the recess 13 of the case 2 with the surface provided with the terminals 5 and the IC chip 15 facing down. The IC plate 4 is fixed to the bottom wall 8 with an adhesive or by welding.

Figure 4:
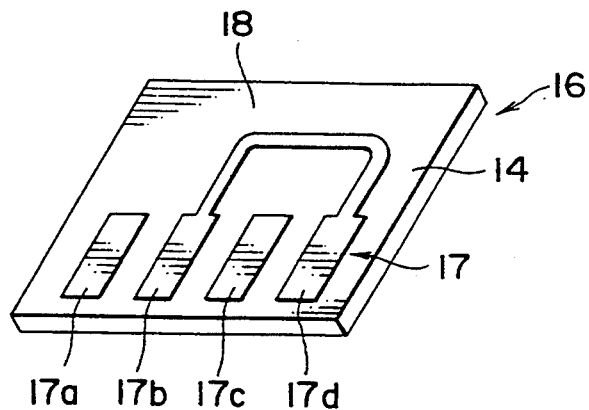
FIG. 4 is a perspective view of a terminal plate suitable for use in combination with the recording medium cassette of FIG. 1.

Referring-to FIG. 4, a terminal plate 16 has a printed wiring board 14, terminals 17 and a conductor 18 connecting the terminals 17. The recognition output terminals 17a, 17b and 17c are connected beforehand to the grounding terminal 17d in a predetermined combination representing information about the recording medium cassette 1. The three recognition terminals 17a, 17b and 17c are able to represent $2^3$ pieces of information about the recording medium cassette 1. The terminal ]plate 16 thus formed is fixedly placed in the recess 13 of the case 2 by a method similar to that for fixedly placing the IC plate 4 in the recess 13.

A recording/reproducing apparatus suitable for using the recording medium cassette with IC and the recording medium cassette with terminals will be described hereinafter, in which the recording medium cassette with IC will be called an IC type recording medium cassette, and the recording medium cassette with terminals will be called a terminal type recording medium cassette.

Figure 5:
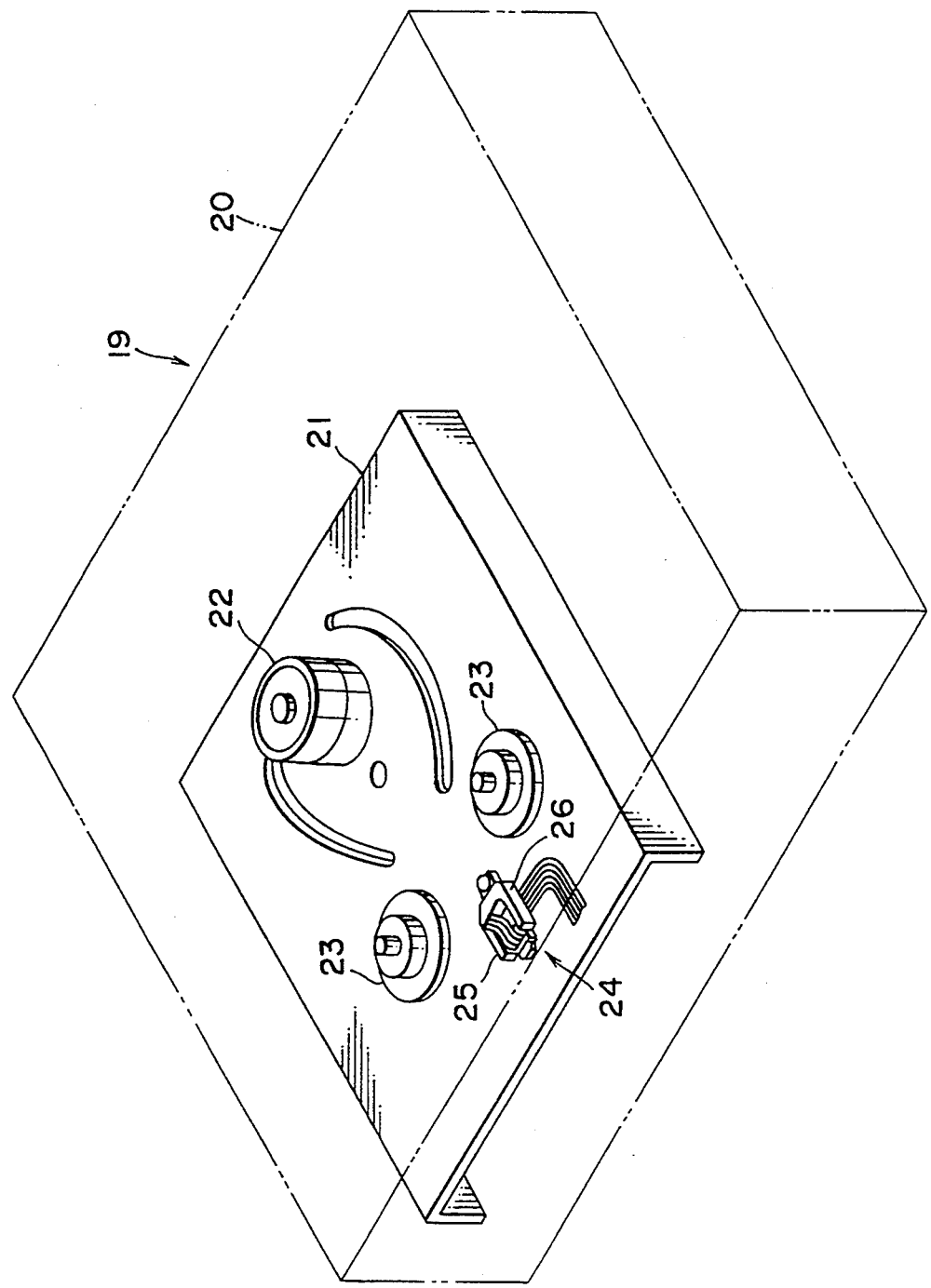
FIG. 5 is a schematic perspective view of an essential portion of a mechanical chassis included in a recording/reproducing apparatus in accordance with the present invention.

Referring to FIG. 5, a recording/reproducing apparatus 19 comprises a cabinet 20 and a mechanical chassis 21 disposed within the cabinet 20. Mounted on the mechanical chassis 21 are a drum 22, reel tables 23 and a connector 24. When the recording medium cassette 1, i.e., either the IC type recording medium cassette or the terminal type recording medium cassette, is inserted in the recording/reproducing apparatus 19, the terminals 5 or the terminals 17 coincide with the detecting terminals 26 of the connector 24.

Figure 6:
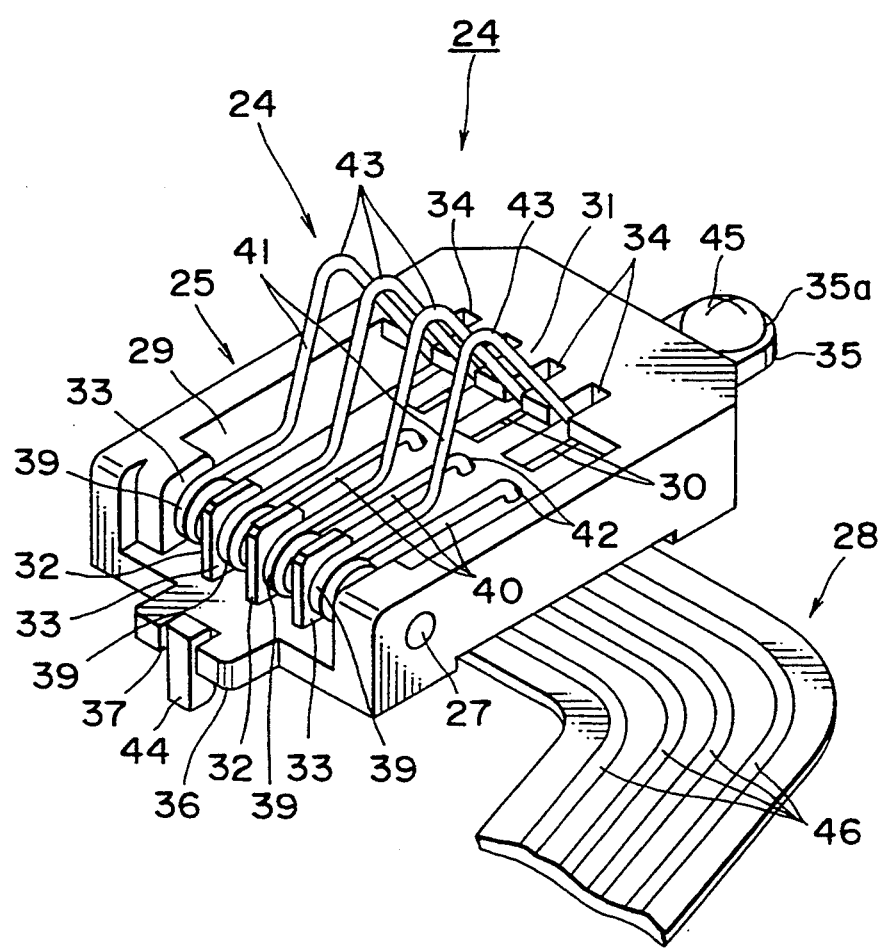
FIG. 6 is a perspective view of a connector fixedly mounted on the mechanical chassis of FIG. 5.

As shown in FIG. 6, the connector 24 comprises a casing 25, the detecting terminals 26, a shaft pivotally supporting the detecting terminals 26 on the casing 25, and a flexible cable 28 for connecting the connector 24 to a power supply and for transmitting signals. The casing 25 is formed of an insulating material, such as a synthetic resin, and is provided with a recess 29 opening upward and backward. Grooves 30 are formed in the front portion of the bottom surface of the recess 29 to form an overhang 31 at the front end of the recess 29. Support walls 32 are arranged laterally at regular intervals along the rear end of the recess 29 to form spaces 33 therebetween and between the side walls of the recess 29 and the support walls 32. Positioning recesses 34 are formed in the overhang 31 at positions respectively corresponding to the support walls 32. An attaching lug 35 is formed in the middle portion of the front end of the case 25. A positioning lug 36 provided with a recess 37 is formed in the middle portion of the rear end of the case 25. Through holes 38 are formed in the lower wall of the case 25 at positions between the spaces 33 and the overhang 31 so as to correspond to the spaces 33.

Terminals 26 are formed by bending a conductive spring wire in the shape of a torsion coil spring. Each terminal 26 has a coil portion 39, a lower arm 40 and an upper arm 41. The free end of the lower arm 40 is bent down at right angles to form a connecting end 42. The connecting end 42 is inserted in the through hole 38 of the case 25 and connected to a conductor 46 of the flexible cable 28. The front portions of the upper arms 41 are bent down in the shape of an inverted letter V to form contact portions 43. The extremities of the upper arms 41 are inserted in the positioning recesses 34, respectively.

The coil portions 39 of the detecting terminals 26 are fitted in the spaces 33 between the support walls 32 with the lower arms 40 extended along the bottom surface of the recess 29 of the case 25 and the extremities of the connecting portions 42 projecting downward from the bottom surface of the case 25. The extremities of the upper arms 41 are movable in the positioning recesses 34.

The connector 24 thus formed is placed on the mechanical chassis 21 with the recess 37 of the positioning lug 36 in engagement with a positioning projection 44 and is fixed to the mechanical chassis 21 with a screw 45 screwed through the attaching lug 35 in the mechanical chassis 21.

The flexible cable 28 connects the connector 24 to a circuit of the recording/reproducing apparatus 19, including a microcomputer. The detecting terminals 26 of the connector 24 are connected to the conductors 46 of the flexible cable 28, respectively.

When the recording medium cassette 1 is placed on the cassette holder, not shown, of the recording/reproducing apparatus 19, the recording medium cassette 1 is lowered as far as the holes 12 of the tape reels 3 engage the reel tables 23 of the recording/reproducing apparatus 19, respectively. In this state, the terminals 5 or 17 of the recording medium cassette 1 come into contact with the contact portions 43 of the detecting terminals 26, respectively. When depressed by the terminals 5 or 17 of the recording medium cassette 1, the upper arms 41 of the connector 24 are flexed resiliently downward and the contact portions 43 of the detecting terminals 26 move slightly forward relative to the terminals 5 or 17 of the recording medium cassette 1. Thus, the detecting terminals 26 are in resilient contact with the terminals 5 or 17 of the recording medium cassette 1 to avoid imperfect contact.

When the IC type recording medium cassette provided with the IC plate 4 is inserted in the recording/reproducing apparatus 19, a supply voltage is applied to the power supply terminal 5a of the printed wiring board 14, a signal provided by the microcomputer is applied to the data I/O terminal 5b, a clock signal is applied to the clock terminal 5c, a grounding signal is applied to the grounding terminal 5d, and then data reading operation is started.

When the terminal type recording medium cassette 1 provided with the terminal plate 16 is inserted in the recording/reproducing apparatus 19, a supply voltage $V_{cc}$ is applied through resistors R101, R102 and R103 to the terminals 17a, 17b and 17c, respectively, the terminal 17d is connected through a terminal $P_4$ to the ground, and then a recognizing operation is started.

The IC plate 4 or the terminal plate 16 of the recording medium cassette 1 inserted in the recording/reproducing apparatus 19, and the configuration and actions of the circuits of the recording/reproducing apparatus 19 will be described hereinafter.

Figure 7:
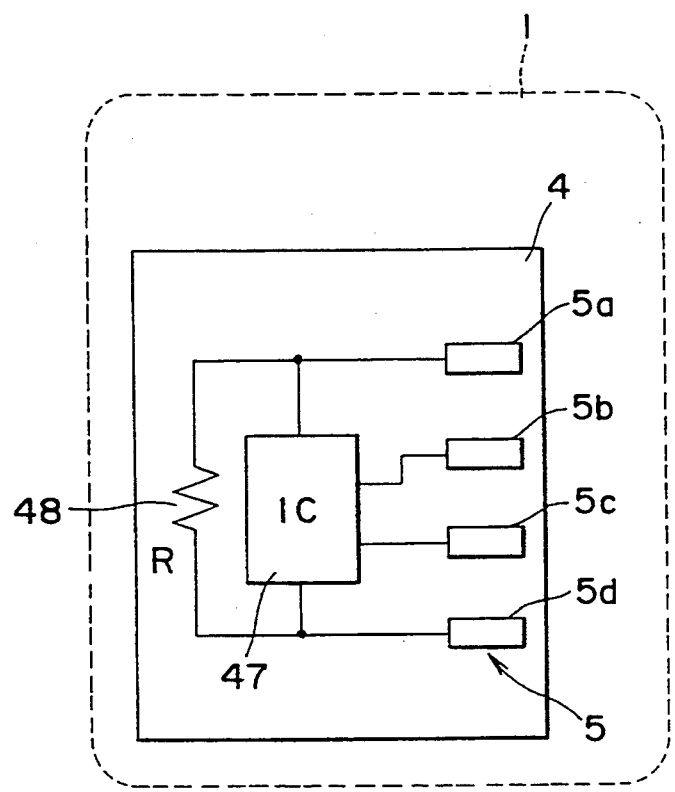
FIG. 7 is a block diagram of an IC plate to be mounted on a recording medium cassette suitable for use in combination with a recording/reproducing apparatus in accordance with the present invention.

Referring to FIG. 7, the IC plate 4 fixedly disposed within the IC type recording medium cassette 1 comprises the terminals 5, i.e., the power supply terminal 5a, the data I/O terminal 5b, the clock terminal 5c and the grounding terminal 5d, an IC chip 47 and a resistor R. The power supply terminal 5a is connected to the IC chip 47 and one end of the resistor R, the data I/O terminal 5b and the clock terminal 5c are connected to the IC chip 47, and the grounding terminal 5d is connected to the IC chip 47 and the other end of the resistor R.

The IC chip 47 comprises a memory, not shown, and a central processing unit (CPU), not shown. The memory comprises a ROM/RAM for storing data provided by the CPU and provides address data specified by the CPU. The CPU communicates with the recording/reproducing apparatus 19 and the internal memory. The CPU communicates through the data I/O terminal 5b with the recording/reproducing apparatus 19 in a serial data transfer mode at a data transfer rate in a range 1 to 2 Mb/sec. The CPU serves as an interface that reads data from the internal memory and converts the data into serial data. The CPU communicates with the internal data in a parallel communication mode for rapid internal processing, which is determined by the data bus of the ROM/RAM. The operation of the CPU is controlled by the clock signal given thereto through the clock terminal 5c. The operating speed of the CPU is dependent on the frequency of the clock signal. Therefore, the data transfer rate can be increased by giving a clock signal having a higher frequency to the CPU.

The resistor R and the IC chip 47 are connected in parallel to the power supply terminal 5a to divide the supply voltage applied to the power supply terminal 5a by the recording/reproducing apparatus 19. The voltage that appears at the power supply terminal 5a is about half the supply voltage $V_{cc}$.

Figure 8:
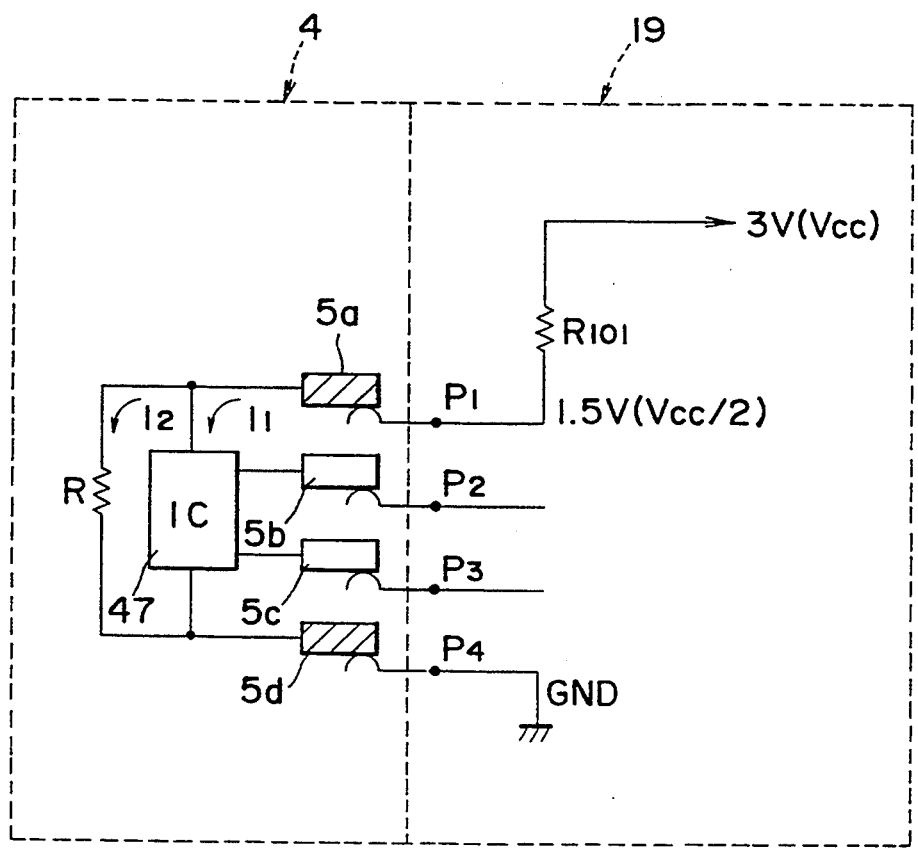
FIG. 8 is a circuit diagram of a voltage setting circuit for setting a voltage in connecting a recording medium cassette with IC with a recording/reproducing apparatus.

For example, as shown in FIG. 8, the resistor R101 has one end connected to the power supply having a supply voltage $V_{cc}$ of 3 V and the other end connected to the terminal $P_1$. When connecting the IC Plate 4 to the recording/reproducing apparatus 19, the power supply terminal 5a and the grounding terminal 5d are pressed against the terminals P1 and P4 of the recording/reproducing apparatus 19, respectively. When the supply voltage $V_{cc}$ is applied across the terminals $P_1$ and $P_4$, a current $I_1$ flows through the IC chip 47 and a current $I_2$ flows through the resistor R. The resistances of the resistors R and R101 are determined so that the potential of the power supply terminal 5a is about half the supply voltage $V_{cc}$ of, for example, 3 V, i.e., 1.5 V by using t, he following expressions.

$$(I_1+I_2)R101=1.5 \text{ (V)} \qquad (1)$$

$$I_2R=1.5 \text{(V)} \qquad (2)$$

The current $I_1$ is dependent on the current capacity of the IC chip 47. For example, when $I_1=3$ mA and $I_2=6$ mA, $R101\approx 167\Omega$ from the expression (1), and $R=250\Omega$ from the expression (2). If the potential (1.5 V) of the power supply terminal 5a and the current $I_1$ are stable, the resistor R may be omitted. The resistances of the resistors R and R101 need to be determined on the basis of the voltage capacity of the IC chip 47 and the supply voltage Vcc of the recording/reproducing apparatus 19.

Figure 9:
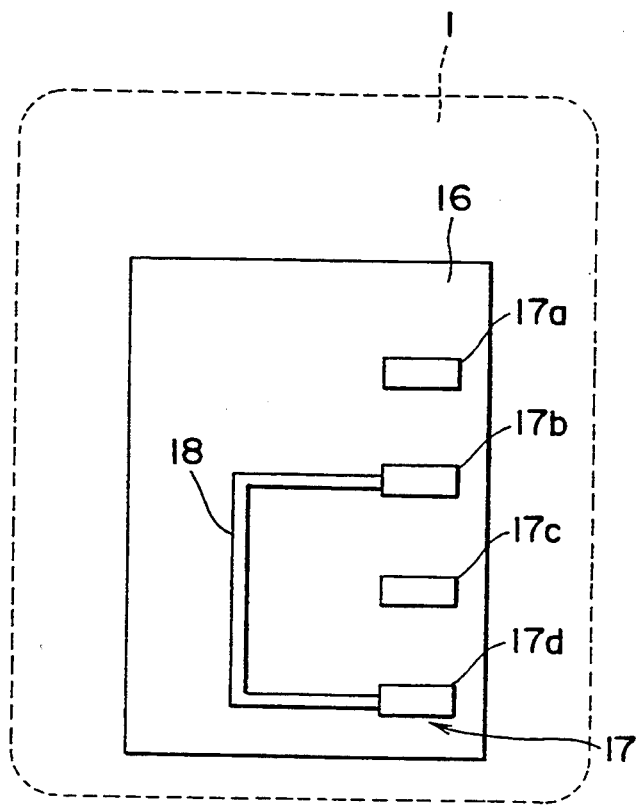
FIG. 9 is a diagram of a terminal plate to be mounted on a recording medium cassette suitable for use on a recording/reproducing apparatus in accordance with the present invention.

As shown in FIG. 9, the terminals 17a, 17b and 17c of the terminal plate 16 of the terminal type recording medium cassette 1 serve as recognition terminals. The terminals 17 are connected in a circuit pattern by the conductors 18 to obtain recognition signals. For example, when the terminals 17 are connected in a circuit pattern as shown in FIG. 9, signals HIGH, LOW and HIGH appear at the recognition terminals 17a, 17b and 17c, respectively.

Thus, the terminal type recording medium cassette 1 provided with the terminal plate 16 has the terminals 17 and the conductor 18. Since the recognition terminal 17a is open, the potential of the recognition terminal 17a is equal to the supply voltage $V_{cc}$ when the recognition terminal 17a is connected through the resistor R101 to the power supply of the recording/reproducing apparatus 19. Since the recognition terminal 17b is connected to the grounding terminal 17d, the potential of the recognition terminal 17d is equal to the ground potential. The recording/reproducing apparatus 19 detects the respective potentials of the recognition terminals 17 and identifies the terminal type recording medium cassette 1 from the combination of the potentials of the recognition terminals 17 among eight combinations.

A cassette identifying circuit for discriminating between the IC type recording medium cassette provided with the IC plate 4 and the terminal type recording medium cassette provided with the terminal plate 16 will be described hereinafter.

Figure 10:
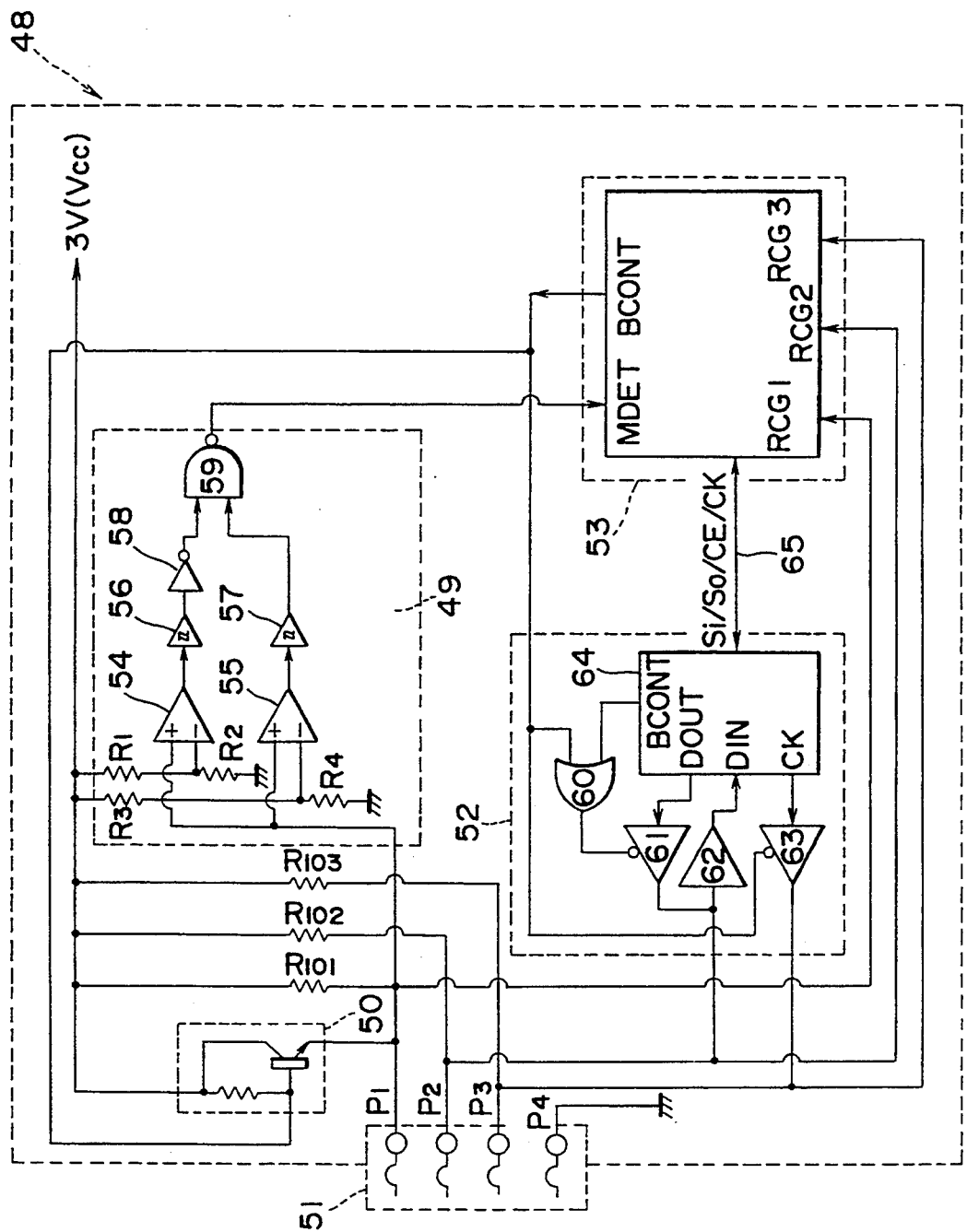
FIG. 10 is a circuit diagram of a recording/reproducing apparatus in accordance with the present invention.

FIG. 10 shows a circuit for reading the contents of the IC plate 4 and the terminal plate 16. A cassette identifying circuit 49 identifies the recording medium cassette 1 inserted in the recording/reproducing apparatus 19 automatically on the basis of signals given thereto through the connector 24. A communication circuit 48 comprises the cassette identifying circuit 49, resistors R101, R102 and R103, a switch 50, a terminal assembly 51, an interface 52 and a microcomputer 53.

The power supply having a supply voltage $V_{cc}$ (3 V) is ,connected to one end of each of the resistors $R_1$ and $R_3$ of the cassette identifying circuit 49, one end of each of the resistors R101, R102 and R103, and the collector side of the switch 50.

The cassette identifying circuit 49 comprises comparators 54 and 55, resistors $R_1$, $R_2$, $R_3$ and $R_4$, Schmitt trigger circuits 56 and 57, an inverter 58, and a NAND gate 59. The comparator 54 has a positive input terminal, i.e., a noninverting terminal, connected to the terminal $P_1$ of the terminal assembly 51 and the positive input terminal of the comparator 55, a negative input terminal, i.e., an inverting terminal, connected to the junction of the other end of the resistor $R_1$ and one end of the resistor $R_2$, and an output terminal connected to the input terminal of the Schmitt trigger circuit 56. The resistor $R_2$ is grounded. The comparator 55 has a positive input terminal connected to the terminal $P_1$ of the terminal assembly, a negative input terminal connected to the junction of the other end of the resistor $R_3$ and one end of the resistor $R_4$, and an output terminal connected to the input terminal of the Schmitt trigger circuit 57. The resistor $R_4$ is grounded. The resistances of the resistors $R_1$ and $R_4$ are equal to each other, the resistances of the resistors $R_2$ and $R_3$ are equal to each other and, for example, $R_1/R_2 = \frac{1}{3}$.

Each of the Schmitt trigger circuits 56 and 57 and the inverter 58 has one input terminal and one output terminal. The Schmitt trigger circuit 56 has an input terminal connected to the output terminal of the comparator 54, and an output terminal connected to the input terminal of the inverter 58. The inverter 58 has an input terminal connected to the output terminal of the Schmitt trigger circuit 56, and an output terminal connected to the input terminal of the NAND gate 59. The Schmitt trigger circuit 57 has an input terminal connected to the output terminal of the comparator 55, and an output terminal connected to the input terminal of the NAND gate 59.

The NAND gate has two input terminals and one output terminal; one of the input terminals is connected to the output terminal of the inverter 58, the other input terminal is connected to the output terminal of the Schmitt trigger circuit 57, and the output terminal is connected to the memory detecting terminal $M_{det}$ of the microcomputer 53.

The switch 50, i.e., a switching device, has a collector connected to the power supply, a base connected to the bus control terminal $B_{cont}$ of the microcomputer 53, and an emitter connected to the terminal $P_1$ of the terminal assembly 51.

The terminals $P_1$, $P_2$, $P_3$ and $P_4$ of the terminal assembly 51 are brought into contact with the terminals 5 of the IC plate 4 of the IC type recording medium cassette or the terminals 17 of the terminal plate 16 of the terminal type recording medium cassette, respectively. The terminal $P_1$ of the terminal assembly 51 is connected to the other end of the resistor R101, the emitter of the switch 50, the positive input terminals of the comparators 54 and 55 of the cassette identifying circuit 49, and the recognition terminal RCG1 of the microcomputer 53. The terminal $P_2$ is connected to the other end of the resistor R102, the output terminal of a buffer 61 included in the interface 52, the input terminal of a buffer 62 included in the interface 52, and the recognition terminal RCG2 of the microcomputer 53. The terminal $P_3$ of the terminal assembly 51 is connected to the other end of the resistor R103, the output terminal of a buffer 63 included in the interface 52, and the recognition terminal RCG3 of the microcomputer 53. The terminal $P_4$ of the terminal assembly 51 is grounded.

The interface 52 comprises an OR gate 60, the buffers 61, 62 and 63, and an interface circuit 64. The OR gate 60 of the interface 52 has an input terminal connected to the bus control terminal $B_{cont}$ of the microcomputer 53, another input terminal connected to the bus control terminal $B_{cont}$ of the interface circuit 64, and an output terminal connected to the enable terminal of the buffer 61. The buffer 61 of the interface 52 has an enable terminal connected to the output terminal of the OR gate 60, an input terminal connected to the data-out terminal $D_{our}$ of the interface circuit 64, and an output terminal connected to the terminal $P_2$ of the terminal assembly 51. The buffer 62 of the interface 52 has an input terminal connected to the output terminal of the buffer 61 and the terminal $P_2$ of the terminal assembly 51, and an output terminal connected to the data-in terminal $D_{in}$ of the interface circuit 64. The buffer 63 of the interface 52 has an input terminal connected to the clock terminal CK of the interface circuit 64, and an output terminal connected to the terminal $P_3$ of the terminal assembly 51 and the recognition terminal RCG3 of the microcomputer 53, and an enable terminal connected to the bus control terminal $B_{cont}$ of the microcomputer 53 and the input terminal of the OR gate 60. The interface circuit 64 of the interface 52 has a bus control terminal $B_{cont}$ connected to the input terminal of the OR gate, a data-out terminal $D_{out}$ connected to the input terminal of the buffer 61, a data-in terminal $D_{in}$ connected to the output terminal of the buffer 62, and a clock terminal CK connected to the input terminal of the buffer 63. The interface circuit 64 is connected to the microcomputer 53 by an internal bus 65 having a serial data-in line $S_i$, a serial data-out line $S_o$, a chip select line CE and a clock line CK.

The microcomputer 53 has the bus control terminal $B_{cont}$ connected to the base of the switch 50, the input terminal of the OR gate 60 of the interface 52 and the enable terminal of the buffer 63, an IC memory detection terminal $M_{det}$ connected to the output terminal of the NAND gate 59, the recognition terminal RCG1 connected to the terminal $P_1$ of the terminal assembly 51, the recognition terminal RCG2 connected to the terminal $P_2$ of the terminal assembly, and the recognition terminal RCG3 connected to the terminal $P_3$ of the terminal assembly 51.

Upon the insertion of the recording medium cassette I in the recording/reproducing apparatus 19 and connection of the terminals of the recording medium cassette 1 and the detecting terminals 26 of the connector 24, i.e., the terminals of the terminal assembly 51, the communication circuit 48 decides whether or not the recording medium cassette 1 is provided with the IC plate 4, on the basis of voltages that appear at the terminals $P_1$, $P_2$, $P_3$ and $P_4$ of the terminal assembly 51 (FIG. 8).

If the terminal type recording medium cassette provided with the terminal plate 16 is inserted in the recording/reproducing apparatus 19, the voltage at the terminal P1 of the terminal assembly 51 is 0 V or 3 V. If the IC type recording medium cassette provided with the IC plate 4 is inserted in the recording/reproducing apparatus 19, the voltage at the terminal $P_1$ is about $V_{cc}/2 = 3/2 V = 1.5$ V. The voltage at the terminal $P_1$ of the terminal assembly 51 is dependent on the resistances of the resistor R and the resistor R101 of the communication circuit 48.

(1) Terminal Type Recording Medium Cassette

The communication circuit 48 decides that the terminal type recording medium cassette has been inserted in the recording/reproducing apparatus 19. The recognition output terminals 17a, 17b and 17c and the grounding terminal 17d of the terminal plate 16 (FIG. 9) are connected to the terminals $P_1$, $P_2$, $P_3$ and $P_4$ of the terminal assembly 51 of the communication circuit 48, respectively.

Since the recognition terminal 17a is open and the switch 50 is OFF, the potential of the terminal $P_1$ of the terminal assembly 51 is equal to the supply voltage $V_{cc}$ (3 V). If the recognition terminal 17a is grounded, the potential thereof is about 0 V. A voltage signal representing the potential of the recognition terminal 17a is applied to the respective positive input terminals of the comparators 54 and 55. Then, the output terminal of the comparator 54 goes HIGH when voltage at the positive input terminal the comparator 54 is $V_{cc}$ (3 V). The output terminal of the comparator 55 goes HIGH when voltage at the positive input terminal of the comparator 54 is $V_{cc}$. This state, however, does not meet input conditions for the NAND gate 59.

When the potentials of the positive input terminals of the comparators 54 and 55 are about 0 V, the output terminals of the comparators 54 and 55 go LOW. This state also does not meet the input conditions for the NAND gate 59.

The input conditions for the NAND gate 59 are met when the output terminal of the comparator 54 is LOW and the output terminal of the comparator 55 is HIGH. That is, the resistances of the resistors are determined so that the comparator 54 does not go HIGH and the comparator 55 goes HIGH when voltages obtained by dividing the supply voltage $V_{cc}$ by the resistors $R_1$, $R_2$, $R_3$ and $R_4$ ($R_1 = R_4$, $R_2 = R_3$) are applied to the negative input terminals of the comparators 54 and 55, and the potential of the terminal $P_1$ of the terminal assembly 51 is about 1.5 V. Therefore, if the potential of the terminal $P_1$ of the terminal assembly 51 is either about 3 V or about 0 V, the input conditions for the NAND gate 59 are not met and the output terminal of the NAND remains HIGH and hence the memory detecting terminal $M_{det}$ of the microcomputer 53 is HIGH.

When the memory detecting terminal $M_{det}$ is HIGH, the bus control terminal $B_{cont}$ of the microcomputer 53 remains LOW to inhibit the operation of the interface 52 and to hold the switch 50 OFF and, consequently, the supply voltage $V_{cc}$ is applied through the resistor R101 to the terminal $P_1$ of the terminal unit 51. The microcomputer 53 receives the recognition signal provided at the recognition output terminal 17a of the terminal plate 16 through the terminal $P_1$ at the recognition terminal RCG1, the recognition signal provided at the recognition output terminal 17b through the terminal $P_2$ at the recognition terminal RCG2 and the recognition signal provided at the recognition output terminal 17c through the terminal $P_3$ at the recognition terminal RCG3 to identify the recording medium cassette 1. Thus, the microcomputer 53 receives the recognition signals representing information about the recording medium cassette 1 including the type and thickness of the magnetic tape of the recording medium cassette 1.

(2) IC Type Recording Medium Cassette

The communication circuit 48 identifies the IC type recording medium cassette when the IC type recording medium cassette is inserted in the recording/reproducing apparatus 19. When the IC type recording medium cassette is inserted in the recording/reproducing apparatus 19, the power supply terminal 5a, the data I/O terminal 5b, the clock terminal 5c and the grounding terminal 5d of the IC plate 4 are connected to the terminals P$_1$, P$_2$, P$_3$ and P$_4$ of the terminal assembly 51 of the communication circuit 48, respectively.

As explained previously with reference to FIG. 8, the power supply terminal 5a is connected through the IC chip 47 and the resistor R to the grounding terminal 5d. The resistance of the resistor R of the IC plate 4 is determined so that the potential of the terminal P$_1$ of the terminal assembly 51 is about 1.5 V (about V$_{cc}$/2) when the IC plate 4 is connected to the communication circuit 48. Accordingly, when the IC plate 4 of the IC type recording medium cassette is connected to the communication circuit 48, a voltage of about 1.5 V appears at the terminal P$_1$ of the terminal assembly 51 to apply a voltage of about 1.5 V to the positive input terminals of the comparators 54 and 55 of the cassette identifying circuit 49, the output terminal of the comparator 54 goes LOW and the output terminal of the comparator 55 goes HIGH. Consequently, the input conditions for the NAND gate 59 are satisfied and the memory detecting terminal M$_{det}$ of the microcomputer 53 goes LOW.

When the memory detecting terminal M$_{det}$ of the microcomputer 53 goes LOW, the bus control terminal B$_{cont}$ goes HIGH, the switch 50 goes ON to apply the supply voltage V$_{cc}$ (3 V) to the terminal P$_1$ of the terminal assembly 51. Consequently, the supply voltage V$_{cc}$ (3 V) is applied to the IC chip 47 of the IC plate 4 to actuate the IC chip 47.

Meantime, the OR gate 60 of the interface 52 makes the buffers 61 and 63 become ENABLE when the bus control terminal B$_{cont}$ of the microcomputer 53 goes HIGH to send a clock signal through the clock terminal CK of the interface circuit 64 and the terminal P$_3$ of the terminal assembly 51 to the IC chip 47 of the IC plate 4. Then, the IC chip 47 is able to communicate with the recording/reproducing apparatus 19.

The microcomputer 53 of the communication circuit 48 sends command signals requiring sending data through the interface 52 to the IC chip 47 of the IC plate 4, and then the IC chip 47 sends data through the terminal P$_2$ of the terminal assembly 51 to the microcomputer 53. When recording data on the IC chip 47 of the IC plate 4 of the IC type recording medium cassette, the microcomputer 53 sends a command signal requesting recording to the data source.

More concretely, if data has been recorded on the IC chip 47 of the IC plate 4 of the IC type recording medium cassette, the microcomputer 53 reads the data from the IC chip 47 and decides the category of the IC type recording medium cassette, such as a rental recording medium cassette or a recording medium cassette holding data, on the basis of the data. If the recording medium cassette has not recorded any data yet, the IC chip 47 records information about the recording medium cassette including the length of the tape of the recording medium cassette, the available capacity of the recording medium cassette, the amount of data recorded and the time and date of recording in a predetermined sequence.

The data is exchanged between the IC chip 47 and the microcomputer 53 only through the data I/O terminal 5b; the data of the recording medium cassette is read when the recording medium cassette is inserted in the recording/reproducing apparatus 19 and the data is written in the IC chip 47 when the recording or reproducing operation is completed. The cassette identifying circuit 49 is able to identify recording medium cassettes of all possible sizes automatically, provided that the terminals of the terminal plates or the IC plates of the recording medium cassettes are formed at the same specified positions. The terminals of the terminal plate and the IC plate may be disposed on the back wall or the side wall of the case instead of disposing the same on the bottom wall of the case.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A recording/reproducing apparatus for recording information on a recording medium of a recording medium cassette and reproducing information recorded on the recording medium of the recording medium cassette, said recording/reproducing apparatus comprising:

means capable of receiving a first type of recording medium cassette provided with an IC (integrated circuit) chip and a plurality of terminals connected to the IC chip and arranged on an outer surface of a case thereof, and a second type of recording medium cassette which does not include an IC chip and is provided with a plurality of terminals connected by conductors in a predetermined circuit pattern and arranged on an outer surface of a case thereof at positions corresponding to those of the plurality of terminals of the first type of recording medium cassette; and cassette identifying means for contacting the respective plurality of terminals of the received recording medium cassette and, based upon at least one signal received therefrom, for identifying the received recording medium cassette as one of the first and second types of recording medium cassettes.

2. A recording/reproducing apparatus according to claim 1, wherein said cassette identifying means identifies the received recording medium cassette substantially simultaneously with the connection of the received recording medium cassette to the cassette identifying means.

3. A recording/reproducing apparatus according to claim 2, wherein said cassette identifying means identifies the first type of recording medium cassette on the basis of the at least one signal from at least one specified terminal among the plurality of terminals of the first type of recording medium cassette, and identifies the second type of recording medium cassette on the basis of the at least one signal from at least one specified terminal among the plurality of terminals of the second type of recording medium cassette.

4. A recording/reproducing apparatus according to claim 3, wherein said at least one signal is a voltage signal.

5. A recording/reproducing apparatus according to claim 4, wherein the plurality of terminals of the second type of recording medium cassette connected by said conductors in said predetermined circuit pattern represent information about the second type of recording medium cassette and identification information.

6. A recording/reproducing apparatus according to claim 5, wherein said cassette identifying means establishes an enable state enabling communication between the IC chip and the recording/reproducing apparatus when the first type of recording medium cassette is inserted in the recording/reproducing apparatus, and reads the information about the second type of recording medium cassette when the second type of recording medium cassette is inserted in the recording/reproducing apparatus.

* * * * *